G. D. WHITE.
CAR FENDER.
APPLICATION FILED OCT. 9, 1911.

1,050,412.

Patented Jan. 14, 1913.

2 SHEETS—SHEET 1.

Witnesses.
Thos. Castberg.
F. E. Maynard.

Inventor.
Gaston D. White.
by G. H. Strong.
Atty

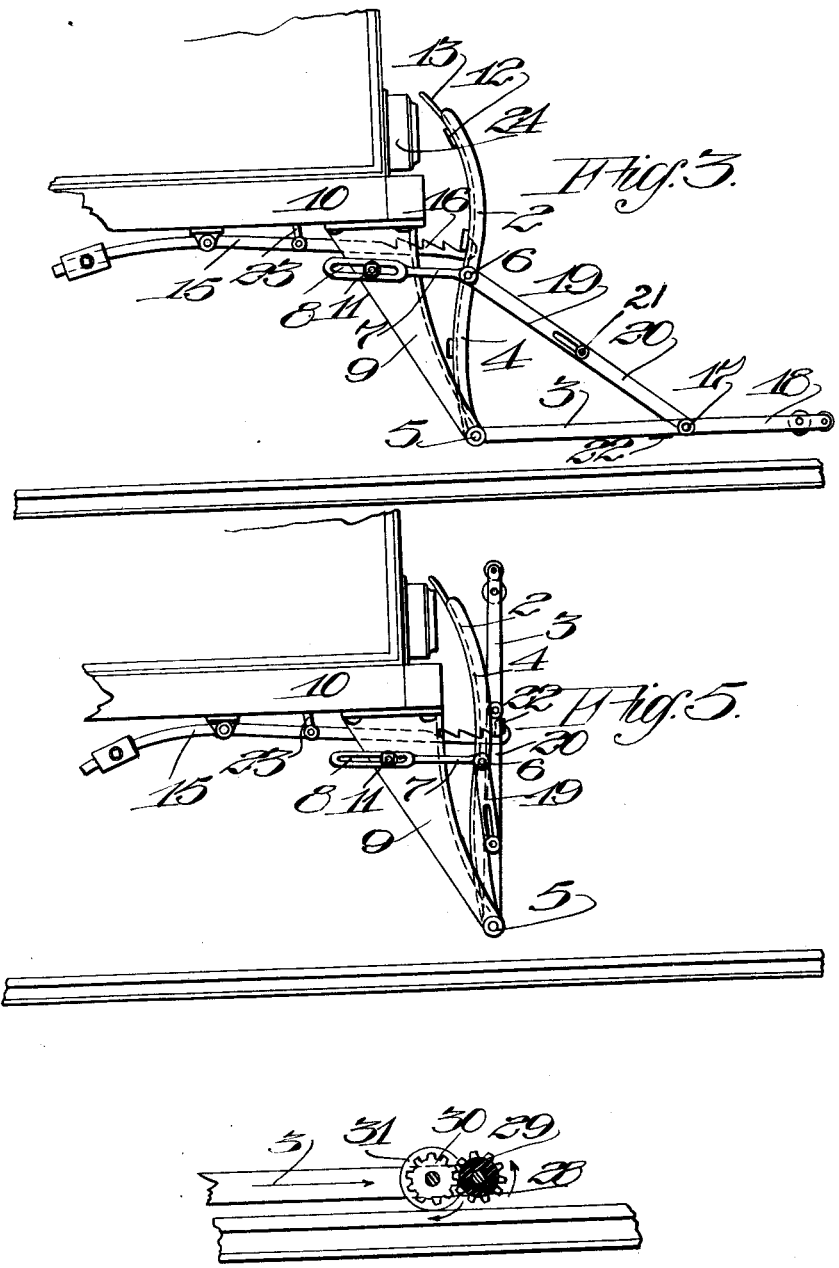

UNITED STATES PATENT OFFICE.

GASTON D. WHITE, OF PORTOLA, CALIFORNIA.

CAR-FENDER.

1,050,412.  Specification of Letters Patent.  Patented Jan. 14, 1913.

Application filed October 9, 1911. Serial No. 653,464.

*To all whom it may concern:*

Be it known that I, GASTON D. WHITE, a citizen of the United States, residing at Portola, in the county of Plumas and State of California, have invented new and useful Improvements in Car-Fenders, of which the following is a specification.

This invention relates to car fenders.

The object of the present invention is to provide a simple, substantial, easily operated car fender adapted to be permanently connected or mounted upon the ends of cars; which may be quickly folded into an upright inoperative position when the car is running in one direction; and which may be readily released and automatically dropped into an operative pickup position as the car is running forward.

It is also an object of the invention to so design a fender that it can be utilized without removal from the car by being automatically operable to form a clearance space through which may be projected rays of light from a headlight, said space permitting the insertion of a link when a series of cars are to be coupled.

A further object of the invention is to provide a guard roller of flexible material mounted at the forward lowermost portion of the fender and which is so operated automatically as to facilitate in picking up an obstruction or person which may be incumbent on the surface in front of the fender.

The invention consists of the parts and the construction and combination of parts, as hereinafter more fully described and claimed, having reference to the accompanying drawings, in which—

Figure 1:
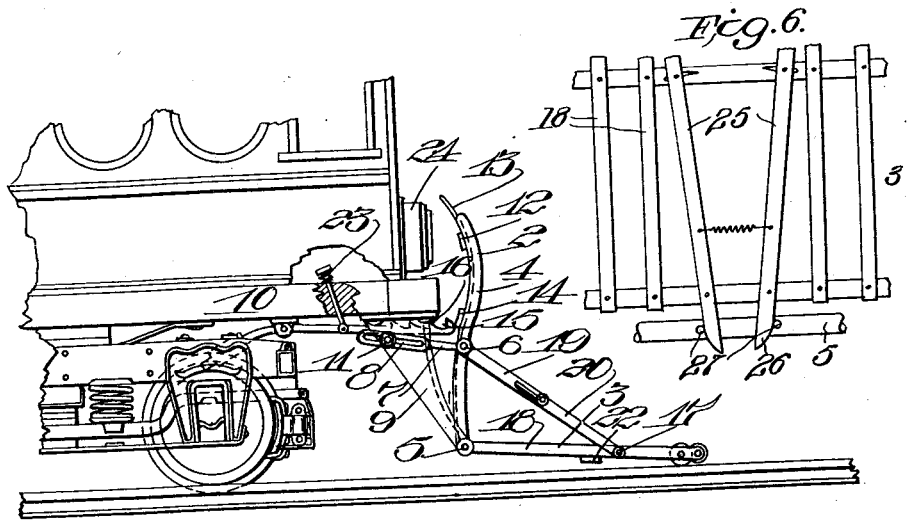
Figure 2:
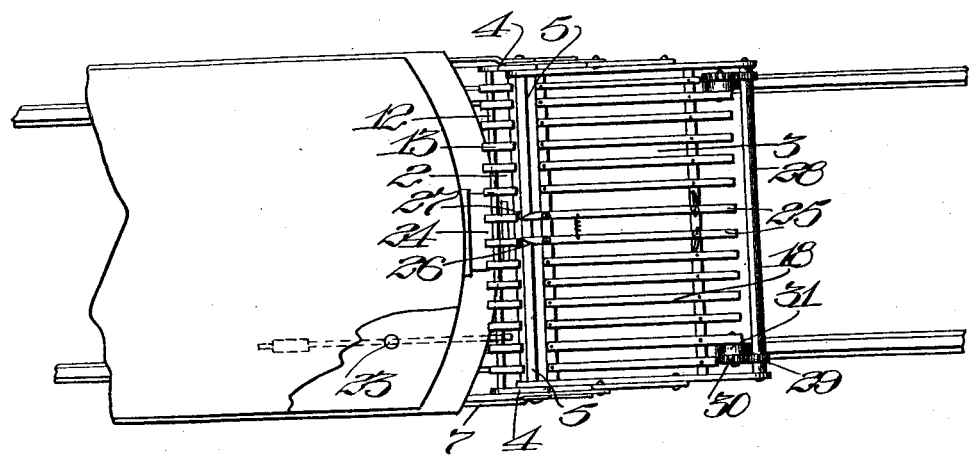

Figure 1 is a side elevation of a portion of the car and the fender, showing it in the lowermost operative position. Fig. 2 is a plan view of the fender and part of the car. Fig. 3 shows the fender in running or normal position. Fig. 4 is a detail section of the roller guard reversing device. Fig. 5 shows the fender in the folded position. Fig. 6 is a detail showing in plan a portion of the bottom member of the fender.

The present embodiment of my invention comprehends a fender composed of two sections, one adapted to extend in front of the car, as at 2, and the other being pivotally connected or related thereto and adapted to be turned from the lowermost position, as at 3, Fig. 1, to a vertical inoperative position. The back 2 of the fender is provided with substantial side arms 4 which are fulcrumed upon a transverse pivot bar 5, the side arms 4 being provided with pins 6 on which are mounted loose links 7 which are slotted, as at 8. The transverse pivot rod 5 is appropriately mounted in brackets or other devices 9, appropriately secured to the car body 10, and upon the brackets 9, of which there is one on each side of the ends of the car, are secured stop pins 11 traveling in the slots 8 of the links 7. The back 2 of the fender may be constructed as desired to produce an effective obstacle to prevent bodies from passing beneath the truck or body of the car, and to that end I have shown the back as provided with transverse rails 12 upon which are secured vertical resilient cushioning slats 13. When the back of the fender is adjusted to its uppermost inoperative position, a stop strip 14 secured to the slats of the fender is engaged and supported by a trip pawl 15 having a plurality of teeth 16 in its upper surface, against any of which the stop guard 14 may be engaged.

In the operative position the bottom portion 3 of the fender is supported at a very slight distance above the ground or track by a flexible link connection, one end of which is pivoted at 17 to the projecting bars 18 of the fender bottom 3. Preferably the links are formed of upper and lower sections 19 and 20 respectively, the upper end of said upper sections being pivoted upon the pin, 6, and said sections being foldable about pins 21 so as to permit the fender bottom 3 to be tilted upwardly about the fulcrum rod 5 until a transverse brace 22 passes over and is engaged by the outer end of the trip pawl 15, as shown in Fig. 5.

When the car is running forward, the fender on the forward end of the car may be released by pressing down the trip pawl 15 through a suitable pedal 23 which is connected to the trip pawl 15. As the vertically folded fender sections 2 and 3 are released by the trip pawl 15 they swing forwardly until the bottom 3 assumes the desired position adjacent to the trackway and the back section 2 swings forwardly until limited by the slotted link 7 engaging with the pins 11 in the brackets 9. The fender bottom 3 can be adjusted to various grades of roadway by providing the trip pawl 15 with notches on one side, the notches being engageable with the bar 22 and holding the fender in the desired angular relation. The fender at the rear end of the car is left folded in the uppermost position when the car is running forward. If at any time it is desired to reverse the direction of the travel of the car, the fender at the rear end is quickly lowered in operative position by simply depressing the lever 23 to actuate the trip pawl 15.

In order to permit the fender to be left permanently mounted upon the car and yet not obstruct the rays of light from the searchlight, as at 24, it is desirable to so design the fender that that portion of the fender formed by the back 2 and the bottom 3 will automatically operate to permit the rays of the headlight to pass unobstructively through. This is readily accomplished by providing, as at 25, a plurality of the scoop-forming slats of the fender so that, as the bottom and the back of the fender are folded into uppermost relative position, the slats will be swung so as to open at their upper ends, forming a clear space in front of the searchlight 24. This opening of the slats is accomplished by forming cam surfaces 26 at the lower ends of the slats adjacent the fulcrum rod 5, upon which are formed spurs or pins 27, these being engaged by the cam surfaces 26 of the fender slats as they are swung vertically about the fulcrum rod 5.

An important purpose of the present invention is to provide a fender which will be equally effective to pick up objects lying flat, as it is to receive those in an erect or partly erect position. This action is accomplished and facilitated by providing at the forward edge of the bottom 3 of the fender a transversely disposed cushioning or soft roller 28, which may be of rubber or other material, and rotatably supporting the same in the forward ends of the brace 18 of the fender bottom. When the fender is in the lowermost operative position, this roller is rotated in the direction opposite to the travel of the car by means of the pinions 29 engaging driving gears 30, which are secured to friction disks 31 rotatable in the bars 18 which are adapted to travel upon the tracks or roadway over which the car passes. The effect of the reverse direction of rotation of the pickup roller 28 when encountering an obstruction in the roadway is to lift the obstruction over the ground and positively roll it on to the lowermost portion of the fender. When any obstruction or body has been projected on to the bottom 3 of the fender and against the back member 2, the fender is automatically tilted backwardly about the fulcrum rod 5, which carries the back member 2 sufficiently upward so that the stop strip 22 passes over the projecting point of the trip pawl 15 and is retained thereby, thus preventing the body from falling out of the fender.

Having thus described my invention, what I claim and desire to secure by Letters Patent is—

1. A car fender comprising a back member and a bottom member, a horizontally transverse shaft upon which the adjacent ends of said members are pivotally mounted, foldable links connecting the body member to the back member, and means for retaining the fender in its lower operative position, said means including slotted links extending rearwardly from the back member of the fender and fixed pins on the sides of the car working in the slots of said links, said back and bottom members of the fender being adapted to be folded into an upright inoperative position about said pivot rod.

2. A car fender comprising a back member and a bottom member, a horizontally transverse shaft upon which the adjacent ends of said members are pivotally mounted, foldable links connecting the body member to the back member, and means for retaining the fender in its lower operative position, said means including slotted links extending rearwardly from the back member of the fender and fixed pins on the sides of the car working in the slots of said links, said back and bottom members of the fender being adapted to be folded into an upright inoperative position about said pivot rod, a bar on the bottom member of the fender and a pivoted trip pawl carried by the car body adapted to engage said bar to thereby maintain the bottom member of the fender in its upward inoperative position.

3. A car fender comprising a back member and a bottom member pivotally connected at their adjacent ends and about which pivot said members are turnable to a vertical position, means for suspending the fender in the said position, and a mechanism for forming a clearance space in the fender to permit the unobstructed passage of rays from the headlight of the car through the upwardly folded fender.

In testimony whereof I have hereunto set my hand in the presence of two subscribing witnesses.

GASTON D. WHITE.

Witnesses:
H. E. HERRING,
ALICE DONNENWIRTH.

---

Copies of this patent may be obtained for five cents each, by addressing the "Commissioner of Patents, Washington, D. C."